(12) United States Patent
Byoun et al.

(10) Patent No.: US 11,763,843 B1
(45) Date of Patent: Sep. 19, 2023

(54) VCM PWM TO LINEAR MODE TRANSITION OFFSET OPTIMIZATION TO IMPROVE PES

(71) Applicant: Western Digital Technologies, Inc., San Jose, CA (US)

(72) Inventors: Jaesoo Byoun, Irvine, CA (US); Brian Johnson, Laguna Hills, CA (US); Hideaki Ito, Fujisawa (JP); Gaku Ikedo, Fujisawa (JP); Naoyuki Kagami, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/742,082

(22) Filed: May 11, 2022

(51) Int. Cl.
  *G11B 5/55* (2006.01)
(52) U.S. Cl.
  CPC .......... *G11B 5/5547* (2013.01); *G11B 5/5543* (2013.01)
(58) Field of Classification Search
  None
  See application file for complete search history.

(56) References Cited

U.S. PATENT DOCUMENTS

| | | | | |
|---|---|---|---|---|
| 3,665,500 A * | 5/1972 | Lewis | ........... | G11B 5/022 360/78.12 |
| 5,289,097 A * | 2/1994 | Erickson | ........... | G11B 19/20 |
| 5,307,439 A * | 4/1994 | Enami | ........... | G11B 19/20 388/829 |
| 5,838,515 A * | 11/1998 | Mortazavi | ........... | H02P 25/034 360/78.12 |
| 6,023,143 A * | 2/2000 | Salina | ........... | H02P 25/034 318/560 |
| 6,850,384 B1 | 2/2005 | Bennett | | |
| 7,224,135 B1 * | 5/2007 | Menegoli | ........... | H02P 25/034 318/434 |
| 7,848,044 B2 | 12/2010 | Kokami et al. | | |

(Continued)

FOREIGN PATENT DOCUMENTS

| JP | 2007-295643 A | 11/2007 |
|---|---|---|
| JP | 2008-152851 A | 7/2008 |
| WO | 2014/065036 A1 | 5/2014 |

OTHER PUBLICATIONS

Liu et al., "Design and Implementation of Pulse Width Modulation Driving System for Voice Coil Motor", Modern Applied Science, vol. 10, No. 10, 4 pages, 2016.

*Primary Examiner* — Peter Vincent Agustin
(74) *Attorney, Agent, or Firm* — Neugeboren O'Dowd PC

(57) ABSTRACT

Various illustrative aspects are directed to a data storage device comprising one or more disks, an actuator arm assembly comprising one or more disk heads and a voice coil motor (VCM), the VCM configured to operate in a PWM mode and a linear mode, and one or more processing devices configured to: seek the VCM towards a target track in the PWM mode; transition the VCM from the PWM mode to the linear mode, wherein the transitioning comprises switching an offset compensation value from a first offset compensation value to a second compensation offset value to compensate for a transition offset induced while transitioning the VCM from the PWM to the linear mode, wherein the first and the second offset compensation values correspond to the PWM and linear modes, respectively, and seek the VCM towards the target track in the linear mode for a linear mode time.

11 Claims, 10 Drawing Sheets

(56) References Cited

U.S. PATENT DOCUMENTS

| | | | |
|---|---|---|---|
| 8,144,420 B1 | 3/2012 | Li et al. | |
| 8,482,873 B1 | 7/2013 | Chue et al. | |
| 2002/0071199 A1* | 6/2002 | Kokami | G11B 5/5547 360/77.02 |
| 2002/0159184 A1* | 10/2002 | Shigematsu | H02P 6/14 360/71 |
| 2002/0180392 A1* | 12/2002 | Hill | G06F 1/26 318/560 |
| 2005/0264920 A1* | 12/2005 | Ziemer | G11B 5/5547 360/78.04 |
| 2020/0112277 A1 | 4/2020 | Lopez et al. | |

* cited by examiner

VCM PWM TO LINEAR MODE TRANSITION OFFSET OPTIMIZATION TO IMPROVE PES

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to the one or more actuators in order to actuate the head radially over the disk in a direction that reduces the PES.

The description provided in the background section should not be assumed to be prior art merely because it is mentioned in or associated with the background section. The background section may include information that describes one or more aspects of the subject technology.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In some cases, when a voice coil motor (VCM) transitions from a pulse-width modulation (PWM) mode to a linear mode, an offset is introduced (herein referred to as the transition offset or transition current offset). This offset, which may be a steady-state offset between the two modes, may cause the PES to increase (i.e., worsen). Aspects of the present disclosure are directed to compensating for/reducing this offset between the two modes, which serves to optimize the PES, as well as power consumption (e.g., by allowing the VCM to be operated in the PWM mode for a longer duration). In some cases, the offset between the PWM and linear modes may be reduced via the use of two power large-scale integrated circuit (PLSI) hardware registers, one for the PWM mode offset and one for the linear/current control loop (CCL) mode offset. Additionally, the control circuitry of the hard disk drive (HDD) is configured to automatically switch to the PWM mode offset (e.g., when the VCM transitions to the PWM mode) and switch to the CCL offset (e.g., when the VCM transitions to the CCL mode).

In some other cases, novel firmware (FW) tuning methods may be employed to determine an optimum offset compensation value, while also considering the power savings, for different PWM frequencies, slew rates, VCM current levels, and/or number of tracks, to name a few non-limiting examples. In some aspects, the present disclosure enables operation of the VCM in the PWM mode (i.e., lower power) for a longer duration than in the prior art, without adversely impacting the PES. Furthermore, in the prior art, the VCM PWM frequency and/or slew rate settings are pre-set (limited ability to change them later) to reduce the PES and random transient vibrations (RTV). Contrastingly, the novel FW tuning methods of the present disclosure enable a higher degree of flexibility for the VCM PWM frequency and/or slew rate setting, as compared to the prior art. In this way, the value(s) for the VCM PWM frequency and/or slew rate may be selected such that they optimize power consumption and the PES.

Various illustrative aspects are directed to a data storage device comprising: one or more disks; an actuator arm assembly comprising one or more disk heads and a voice coil motor (VCM), the VCM configured to operate in a first mode and a second mode, the first mode and the second mode each comprising one of a pulse width modulation (PWM) mode and a linear or current control loop (CCL) mode, the first mode being different from the second mode, and wherein the first mode corresponds to a first offset compensation value and the second mode corresponds to a second offset compensation value; and one or more processing devices, configured to: cause the VCM to seek towards a target track in the first mode for a first duration; control transition of the VCM from under the first mode to a second mode, wherein controlling the transitioning comprises: switching at or near an end of the first duration, an offset compensation value from the first offset compensation value to the second offset compensation value to compensate for a transition offset induced while transitioning the VCM from the first mode to the second mode; and seeking the VCM toward the target track in the second mode for a second duration.

Various illustrative aspects are directed to a data storage device comprising one or more disks; an actuator arm assembly comprising one or more disk heads and a voice coil motor (VCM), the VCM configured to operate in a first mode and a second mode, the first mode and the second mode comprising one of a pulse width modulation (PWM) mode and a linear or current control loop (CCL) mode; and one or more processing devices, configured to perform a calibration routine, wherein performing the calibration routine comprises identifying a mapping between offset compensation values and a track arrival position error signal (PES), wherein each offset compensation value translates to a current offset applied to the VCM in the first mode or the second mode, and wherein the mapping is identified by one or more of (1) measuring the track arrival PES for one or more of: different seek lengths and directions, the directions selected from a group consisting of an inner diameter (ID) to an outer diameter (OD) direction and OD to ID direction, (2) measuring the track arrival PES for different offset compensation values after seek completion, and (3) incrementally reducing a linear mode time and measuring the corresponding track arrival PES.

Various illustrative aspects are directed to a method of operating a data storage device, comprising actuating, by one or more processing devices, a voice coil motor (VCM); causing the VCM to seek towards a target track in a first mode for a first duration; controlling transition of the VCM from under the first mode to a second mode, the first mode and the second mode each comprising one of a pulse width modulation (PWM) mode and a linear or current control loop (CCL) mode, the first mode being different from the second mode, and wherein the first mode corresponds to a first offset compensation value and the second mode corresponds to a second offset compensation value, and wherein the transitioning comprises, switching, at or near an end of the first duration, an offset compensation value from the first offset compensation value to a second compensation offset value to compensate for a transition offset induced while transitioning the VCM from the first mode to the second mode; and seeking the VCM toward the target track in the second mode for a second duration.

Various illustrative aspects are directed to one or more processing devices comprising means for actuating a voice coil motor (VCM); means for determining a current mode of operation of the VCM; means for causing the VCM to seek towards a target track in a first mode for a first duration, wherein the first mode corresponds to a first offset compensation value; means for controlling transition of the VCM from under the first mode to a second mode, the first mode and the second mode each comprising one of a pulse width modulation (PWM) mode and a linear mode, the first mode being different from the second mode, and wherein the means for controlling transition of the VCM comprises means for switching, at or near an end of the first duration, an offset compensation value from the first offset compensation value to a second offset compensation value to compensate for a transition offset induced while transitioning the VCM from the first mode to the second mode, wherein the second offset compensation value corresponds to the second mode; and means for seeking the VCM toward the target track in the second mode for a second duration.

Various illustrative aspects are directed to a data storage device, comprising data storage device, comprising: one or more disks; an actuator arm assembly comprising one or more disk heads and a voice coil motor (VCM), the VCM configured to operate in a pulse width modulation (PWM) mode and a linear mode; and one or more processing devices configured to: determine first and second offset compensation values; determine a linear mode time based at least in part on the first offset compensation value; control the VCM to perform a first calibration seek to a target track, wherein performing the first calibration seek to the target track comprises: seeking the VCM towards the target track in the PWM mode, wherein the first offset compensation value is used while operating the VCM in the PWM mode; transitioning the VCM from the PWM mode to the linear mode, wherein the transitioning comprises switching from the first offset compensation value to the second offset compensation value; and seeking the VCM toward the target track in the linear mode, wherein the second offset compensation value is used while operating the VCM in the linear mode. In some examples, the one or more processing devices are further configured to monitor a first track arrival position error signal (PES), the first track arrival PES corresponding to a PES after the first calibration seek is complete; update one or more of the first offset compensation value and the linear mode time; and monitor a second track arrival PES, the second track arrival PES corresponding to a PES after a second calibration seek using the updated first offset compensation value and the updated linear mode time is complete.

In some examples of the data storage device, method, and one or more processing devices described above, the first mode comprises the pulse width modulation (PWM) mode and the second mode comprises the linear or current control loop (CCL) mode.

Some examples of the data storage device, method, and one or more processing devices may further include processes, features, means, or instructions for determining the first offset compensation value; determining the second duration, wherein the second duration corresponds to a time in linear mode, and wherein determining the second duration is based at least in part on determining the first offset compensation value; monitoring a first track arrival position error signal (PES), the first track arrival PES corresponding to a PES after a first calibration seek using the first offset compensation value and after the second duration is complete; updating one or more of the first offset compensation value and the second duration; monitoring a second track arrival PES, the second track arrival PES corresponding to a PES after a second calibration seek using the updated first offset compensation value and the updated second duration is complete; and comparing the first and the second track arrival PES to determine an optimal offset compensation value and an optimal time in linear mode.

In some examples of the data storage device, method, and one or more processing devices described above, the offset compensation value compensates for the transition offset by inducing an offset in a current applied to the VCM, wherein the transition offset is a steady-state offset between the first and the second modes.

In some examples of the data storage device, method, and one or more processing devices described above, the first offset compensation value translates to a first offset in the current applied to or generated by the VCM and the second offset compensation value translates to a second offset in the current applied to or generated by the VCM.

Some examples of the data storage device, method, and one or more processing devices may further include processes, features, means, or instructions for determining a first transition offset induced while transitioning the VCM from the first mode to the second mode; determining a second transition offset induced while transitioning the VCM from the second mode to the first mode; and determining the first and the second offset compensation values, based at least in part on determining the first and the second transition offsets.

In some examples of the data storage device, method, and one or more processing devices described above, determining each of the first and the second offset compensation values comprises determining a trimming value for trimming a current sense amplifier (CSA) offset. Some examples of the data storage device, method, and one or more processing devices may further include processes, features, means, or instructions for trimming the CSA offset by the corresponding trimming value to induce an offset in a current generated by the VCM.

Some examples of the data storage device, method, and one or more processing devices may further include processes, features, means, or instructions for determining an optimal offset compensation value, wherein the optimal offset compensation value corresponds to a lowest track arrival PES measured while measuring the track arrival PES for different offset compensation values after seek completion.

In some examples of the data storage device, method, and one or more processing devices described above, incrementally reducing the linear mode time and measuring the corresponding track arrival PES comprises determining an optimal offset compensation value, wherein the optimal offset compensation value corresponds to a lowest track arrival PES measured while measuring the track arrival PES for different offset compensation values after seek completion; setting an initial linear mode time for operating the VCM in the second mode; the second mode comprising the linear mode; decreasing the linear mode time by an interval amount; and measuring the corresponding track arrival PES after each decrease in the linear mode time to identify an optimal linear mode time corresponding to a minimal or no increase in the track arrival PES.

Some examples of the data storage device, method, and one or more processing devices may further include processes, features, means, or instructions for setting an initial linear mode time for operating the VCM in the second mode, the second mode comprising the linear mode; setting an initial offset compensation value; adjusting one or more of the initial linear mode time and the initial offset compensation value and measure the corresponding track arrival PES to determine an optimal linear mode time and offset compensation value combination for optimizing the track arrival PES; and calibrating firmware to utilize the optimal linear mode time and offset compensation value combination during seek operations.

In some examples of the data storage device, method, and one or more processing devices described above, each offset compensation value corresponds to a trimming value for trimming a current sense amplifier (CSA) offset. Some examples of the data storage device, method, and one or more processing devices may further include processes, features, means, or instructions for trimming the CSA offset to generate the current offset applied to the VCM to compensate for a transition current offset, wherein the transition current offset corresponds to a steady-state offset or error between the first and the second modes.

Some examples of the data storage device, method, and one or more processing devices may further include processes, features, means, or instructions for comparing the first and the second track arrival PES to determine (1) an optimal time in linear mode, and (2) one or more of an optimal first offset compensation value and an optimal second offset compensation value.

In some examples of the data storage device, method, and one or more processing devices described above, the transition of the VCM from the PWM mode to the linear mode, or vice-versa, induces a transition offset. In some examples of the data storage device, method, and one or more processing devices described above, the corresponding offset compensation value compensates for the transition offset by inducing an offset in a current applied to or generated by the VCM. In some examples of the data storage device, method, and one or more processing devices described above, the transition offset is a steady-state offset between the PWM and the linear modes, and wherein the first offset compensation value translates to a first offset in the current applied to or generated by the VCM and the second offset compensation value translates to a second offset in the current applied to or generated by the VCM.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

DETAILED DESCRIPTION

Figure 1:
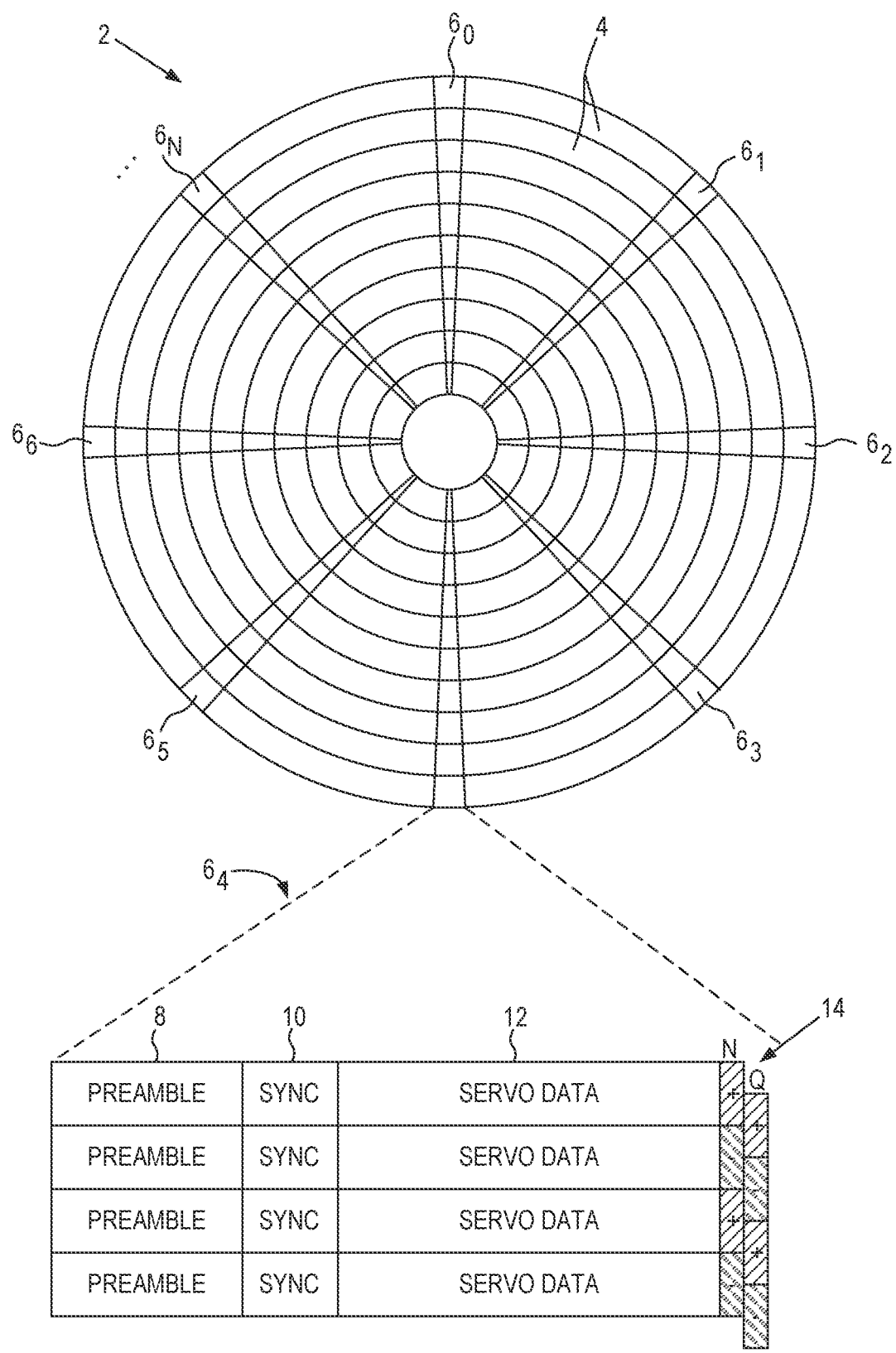
FIG. 1 shows a prior art disk format as comprising a number of radially-spaced, concentric servo tracks defined by servo wedges recorded around the circumference of each servo track.

The word "exemplary" is used herein to mean "serving as an example, instance, or illustration." Any embodiment described herein as "exemplary" is not necessarily to be construed as preferred or advantageous over other embodiments.

The embodiments described below are not intended to limit the invention to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

In some cases, the power large scale integrated circuit (PLSI) comprises a voice coil motor (VCM) driver (shown as VCM driver 1002 in FIG. 10), where the VCM driver applies current to the VCM to actuate the VCM. During a seek operation, the VCM driver (also referred to as a power driver of the VCM) is primarily driven in a pulse width modulation (PWM) mode, which serves to reduce power consumption. However, as the actuator arm assembly comprising the disk heads approaches the target track, the control circuitry 22 switches the drive operation to a linear mode. While the linear mode consumes more power than the PWM mode, it allows for improved accuracy and less current ripple. This transition between the PWM and linear modes generally induces an offset (e.g., steady-state or transition offset), overshoot or undershoot, a steady-state error, or a transient error (e.g., an error in the delta current). In some circumstances, this offset is affected by one or more factors, such as, but not limited to, slew rate of the rise/fall of PWM square wave voltage and frequency of the PWM square wave that produces the effective current to the VCM motor, current level (e.g., of the VCM current), and/or direction (e.g., towards the inner diameter or ID, towards the outer diameter or OD of the disk). As noted above, currently used techniques attempt to pick an "optimum" PWM frequency and slew rate combination that minimizes the offset between the PWM and linear modes. In some circumstances, if the offset is still too high (exceeds a pre-defined threshold), the VCM may be operated for a longer time in the linear mode before the actuator arm assembly finally seeks over the target track. While this allows the servo controller more time to compensate for the position error signal (PES) and reduce the error, such a design is not without its drawbacks, namely, extra power consumption due to the longer time spent in the linear mode during the seek operation.

Aspects of the present disclosure are directed to a refined hardware/firmware (HW/FW) interaction technique for reducing or minimizing the offset between the PWM and linear modes. This may serve to (1) enhance the PES by reducing the offset between PWM and CCL modes, (2) reduce the time in linear mode, (3) reduce power consumption during seeking due to the reduced time in linear mode, and/or (4) allow more flexibility for VCM PWM frequency and/or slew rate settings.

Figure 2:
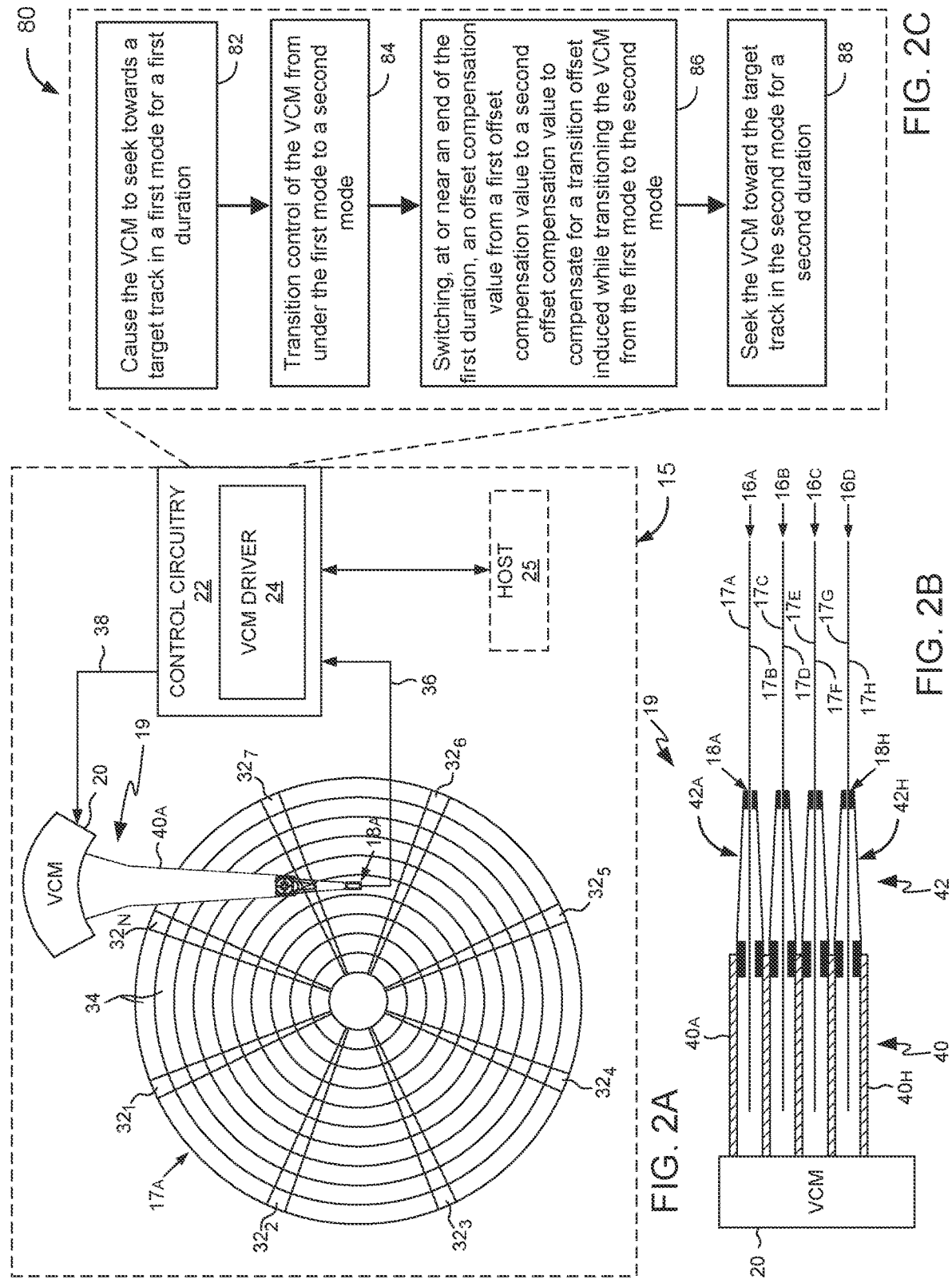
FIGS. 2A and 2B illustrate conceptual block diagrams of a top view and a side view of a data storage device in the form of a disk drive, in accordance with aspects of the present disclosure.
FIG. 2C illustrates a method that a data storage device may perform, execute, and implement, in accordance with aspects of the present disclosure.

Turning now to FIGS. 2A and 2B, which illustrate conceptual block diagrams of a top view and a side view of a data storage device in the form of a disk drive 15, in accordance with aspects of the present disclosure. Disk drive 15 comprises control circuitry 22, an actuator assembly 19, and a plurality of hard disks 16A, 16B, 16C, 16D ("hard disks 16," "disks 16"). FIG. 2C depicts a flowchart for an example method 80 that control circuitry 22 of disk drive 15 may perform or execute in controlling the operations of disk drive 15, including the operations of heads 18 (e.g., heads 18A-18H) disposed on actuator assembly 19, in accordance with aspects of the present disclosure, as further described below. Actuator assembly 19 thus comprises heads 18 and is configured to position the one or more heads 18 over disk surfaces 17 of the one or more disks 16. Heads 18 may each comprise write and read elements, configured for writing and reading control features and data to and from a corresponding disk surface 17 of hard disks 16.

Actuator assembly 19 comprises a primary actuator 20 (e.g., a voice coil motor or VCM, also shown as VCM 1025 in FIG. 10) and a number of actuator arms 40 (e.g., topmost actuator arm 40A, as seen in the perspective view of FIGS. 2A and 2B). Each of actuator arms 40 comprises a head 18 at a distal end thereof (e.g., example head 18A comprised in topmost actuator arm 40A, in the view of FIGS. 2A and 2B). Each of actuator arms 40 is configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and other numbers of fine actuators on each actuator arm, for example.

FIG. 2A also depicts servo sectors 32 (e.g., servo sectors 32$_1$ through 32$_N$) written onto disk surfaces 17. In some cases, when manufacturing a disk drive, servo sectors 32 may be written to disk surfaces 17 to define a plurality of evenly-spaced, concentric tracks 34. As an example, each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align the moveable transducer head (e.g., disk head 18) with and relative to, a particular track 34. Each circumferential track 34 includes a plurality of embedded servo sectors 32 utilized in seeking and track following. The plurality of servo sectors 32 are spaced sequentially around the circumference of a circumferential track 34 and extend radially outward from the inner diameter (ID) of disk surface 17. These embedded servo sectors 32 contain servo information utilized in seeking and track following and are interspersed between data regions on disk surfaces 17. Data is conventionally written in the data regions in a plurality of discrete data sectors. Each data region is typically preceded by a servo sector 32.

In some examples, the control circuitry 22 is configured to control the actuation of the primary actuator (i.e., VCM). Further, the VCM is configured to actuate the head 18 over the disk surfaces 17. In some embodiments, the VCM is configured to operate in a first mode and a second mode, the first mode and the second mode each comprising one of a pulse width modulation (PWM) mode and a linear or current control loop (CCL) mode, where the first mode is different from the second mode, and where the first mode corresponds to a first offset compensation value and the second mode corresponds to a second offset compensation value. The control circuitry 22 is also configured to cause the VCM to seek towards a target track in the first mode for a first duration (82), transition control of the VCM from under the first mode to the second mode (84). In some examples, transitioning the VCM comprises switching, at or near an end of the first duration, an offset compensation value from the first offset compensation value to the second offset compensation value to compensate for a transition offset induced while transitioning the VCM from the first mode to the second mode (86), and seeking the VCM toward the target track in the second mode for a second duration (88).

In some embodiments, the control circuitry 22 provides a PWM control signal to digital transistor switches providing an idle current to the VCM. In one non-limiting example, the PWM modulation circuit includes a plurality of digital transistor switches which provide current in a single direction through the VCM. A sense resistor (shown as $R_s$ in FIG. 10) provides a sensed voltage proportional to the current through the VCM. This sensed voltage is amplified by an amplifier, herein referred to as a current sense amplifier (CSA), shown as CSA 1040 in FIG. 10. In some examples, a comparator circuit provides a comparator output when said amplified voltage exceeds a predetermined value. A delay circuit may be used to activate the transistor switches and turn of a transistor switch in response to the comparator indicating a peak value has been reached. The delay circuitry may also simultaneously start a delay timer, which keeps the switch off for a predetermined time delay until the control current has decayed to the lowest desired value.

Figure 8:
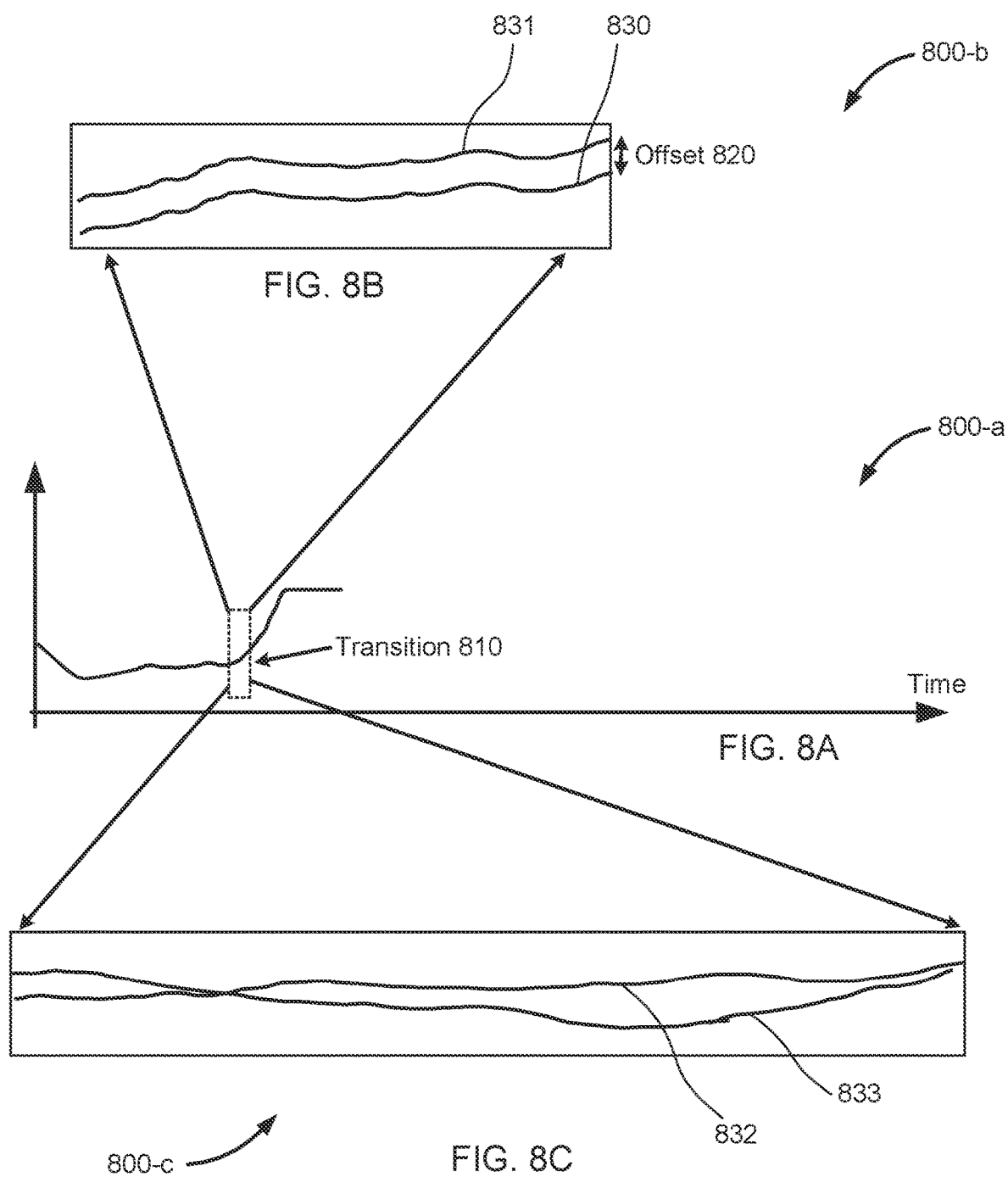
FIGS. 8A-8C depict conceptual graphs of VCM waveforms measured during a transition from a PWM mode to a linear mode in the prior art.

It should be noted that, other techniques for generating a PWM drive voltage are contemplated in different embodiments. For example, the control circuitry 22 or the VCM driver 24 may form a drive current command (e.g., VCM control signal 38 in FIG. 2A, drive command 1008 in FIG. 10) for actuating the VCM based on the position error signal or PES. This drive current command may be converted into an analog signal (shown as $V_{DAC}$ in FIG. 10) by a digital/analog conversion circuit (DAC). In some cases, an output side amplifier (e.g., in the control circuitry 22 or the VCM driver 24) forms a drive voltage having a slew rate (e.g., 50 V/us, 200 V/us, etc.), where the drive voltage is used to drive the VCM. A switch may be used to toggle/transition between the linear and PWM modes. In the linear mode, the drive voltage may be used to directly drive the VCM. Further, in the PWM mode, the drive voltage may be converted into a pulse signal (e.g., by a linear PWM modulation circuit) and input to the VCM. In some cases, the actual measured current ($I_{SENSE}$ or $I_S$ 1006 in FIG. 10) may be converted into a voltage signal by a sense resistor ($R_s$), where the voltage signal is amplified by the CSA and used as a feedback signal (e.g., for the amplifier forming the drive voltage). Further, the CSA output voltage (i.e., corresponding to the actual measured current) is subtracted from the commanded DAC voltage to determine an error signal. In some examples, this error is amplified (e.g., with a certain desired bode response) and the power driver (e.g., power driver 1002 in FIG. 10) is used to drive that error signal. As a result, the drive voltage causes a drive current proportional to the analog signal to flow through the VCM. In some circumstances, an output offset (e.g., shown in FIG. 8B) with respect to the drive current may occur between the PWM and the linear mode, which may lead to current oscillations/fluctuations during the transition between the two modes. In some cases, this output offset is a steady-state offset between the PWM and CCL modes.

As noted above, the VCM driver 24 is primarily in PWM mode during a seek to a target track, which serves to enhance power efficiency. However, as the disk head approaches the target track, the control circuitry 22 is configured to switch the VCM driver 24 to linear mode. While the linear mode utilizes more power than the PWM mode, the linear mode provides better accuracy and less current ripple, thus reducing the PES. Some aspects of the present disclosure are directed to enhancing accuracy (i.e., reducing PES, such as a track arrival PES) at the end of the seek operation, while simultaneously reducing the time spent in the linear mode. In some circumstances, the present disclosure may serve to reduce the power consumption (e.g., at least 100 mW, at least 200 mW, up to or around 500 mW, etc.) per seek operation, as compared to the prior art. This facilitates in reducing battery size and/or enhancing battery life for devices, to name two non-limiting examples.

In the embodiment of FIG. 2A, the control circuitry 22 may comprise a VCM driver 24 (also referred to as a VCM power driver 24). The VCM power driver 24 may implement one or more aspects of the power driver 1002 described in relation to FIG. 10. Further, the control circuitry 22 may process a read signal emanating from the head 18 to demodulate servo data written on the disk (e.g., servo sectors 32) to generate a position error signal (PES) representing an error between the actual position of the head and a target position relative to a target track. The control circuitry 22 may process the PES using a suitable servo control system to generate the VCM control signal 38 applied to the VCM 20 which rotates an actuator arm 40 about a pivot in order to actuate the head 18 radially over the disk surface 17 in a direction that reduces the PES. In one embodiment, the disk drive may also comprise a suitable microactuator, such as a suitable piezoelectric (PZT) element for actuating the head 18 relative to a suspension, or for actuating a suspension relative to the actuator arm 40.

In one embodiment, the servo data (e.g., servo sectors 32) read from the disk surface 17, i.e., in order to servo the head over the disk during access operations, may be self-written to the disk using the control circuitry 22 internal to the disk drive. In some examples, a plurality of spiral servo tracks are first written to the disk surface 17, and then servo sectors 32 are written to the disk while servoing on the spiral servo tracks. In order to write the spiral servo tracks to the disk surface 17, at least one bootstrap spiral track is first written to the disk without using position feedback from servo data (i.e., the actuator or VCM 20 is controlled open loop with respect to servo data on the disk). Before writing the bootstrap spiral track, feedforward compensation is generated by evaluating the back electromotive force (BEMF) voltage generated by the VCM 20 during a calibration seek (where the BEMF voltage represents an estimated velocity of the VCM). The bootstrap spiral track is then written to the disk using the feed-forward compensation.

Figure 10:
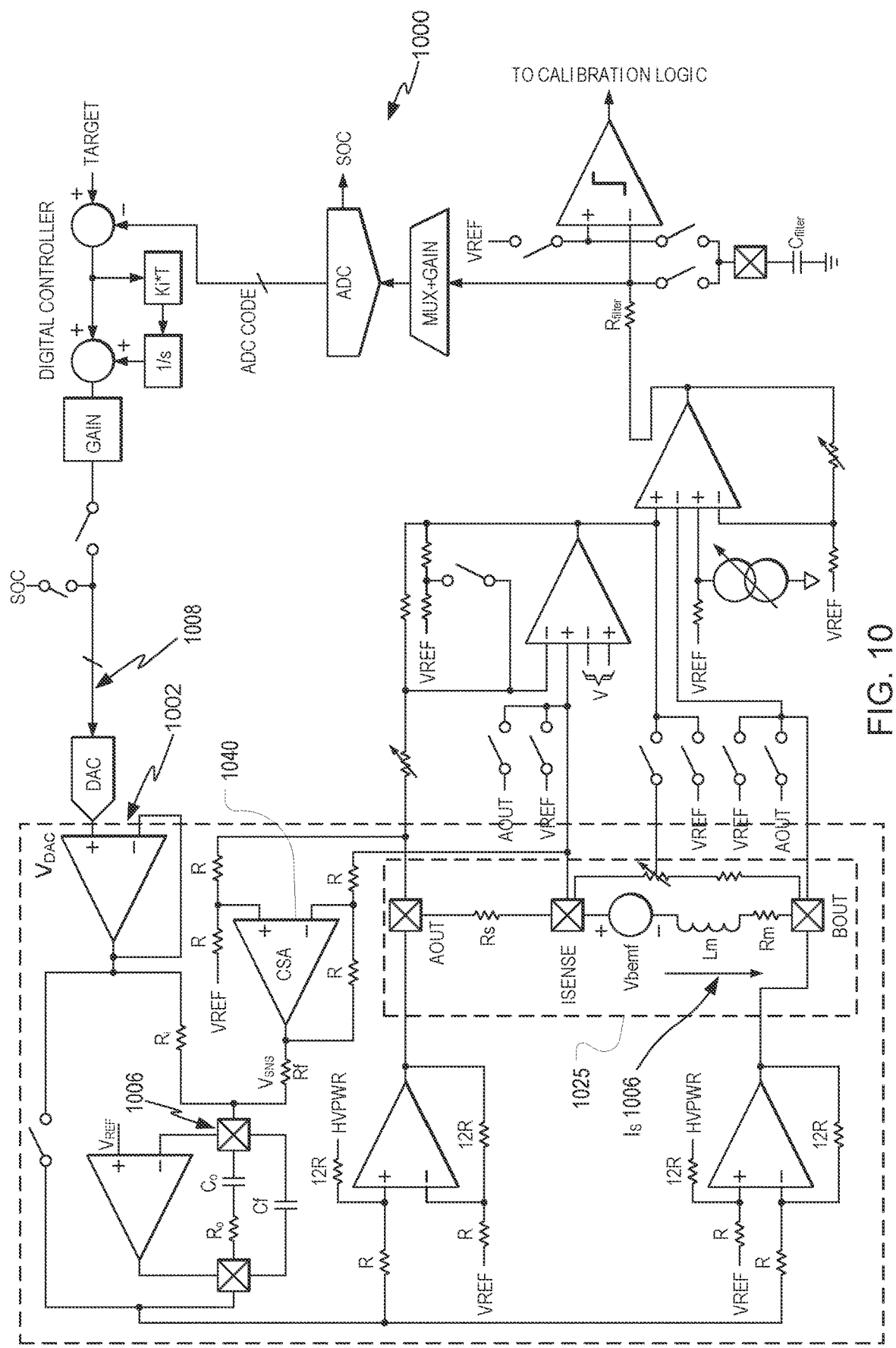
FIG. 10 illustrates a schematic diagram of a VCM and a power driver circuit of a data storage device, such as a disk drive, in accordance with aspects of the present disclosure.

Turning now to FIG. 10, which illustrates a schematic diagram 1000 of a Voice Control Motor (VCM) driver circuit 1002 of a data storage device, such as a disk drive, in accordance with aspects of the present disclosure. In some cases, voice coil actuators work on the principle of a permanent magnetic field and a coil winding. When a current is applied to the VCM coil, a force is generated. This force, known as the Lorentz force, is directly proportional to the input current. By controlling the amount of current applied to the motor, accurate motor positioning may be achieved. In some examples, the current applied to the VCM may be controlled using a current control loop (CCL). In CCL, a sense resistor ($R_s$) is placed in series to the VCM and the voltage across that sense resistor is sensed. In FIG. 10, circuitry 1025 represents an example representation of the VCM, where current 1006 corresponds to the current flowing through the windings of the VCM. As seen, the VCM driver circuit 1002 is connected to a digital to analog converter (DAC) that outputs a DAC voltage ($V_{DAC}$). The VCM driver circuit 1002 further comprises a current sense amplifier (CSA) 1040 having a gain ($G_s$) that amplifies the voltage across the sense resistor ($R_s$), where the amplified voltage is shown as $V_{SNS}$. Specifically, the sensed current ($I_{SENSE}$ or $I_S$ 1006) flowing through the VCM 1025 is converted into a voltage signal using the sense resistor ($R_s$) and amplified by the CSA 1040. In this example, $V_{DAC}/R_i = V_{SNS}/R_f$ where $V_{SNS} = G_s \times R_s \times I_s$, and $G_s$=gain of CSA 1040. Thus, the sensed current 1006 can be calculated as: $I_s = V_{DAC} \times (R_f/G_s \times R_s \times R_i)$.

Figure 3:
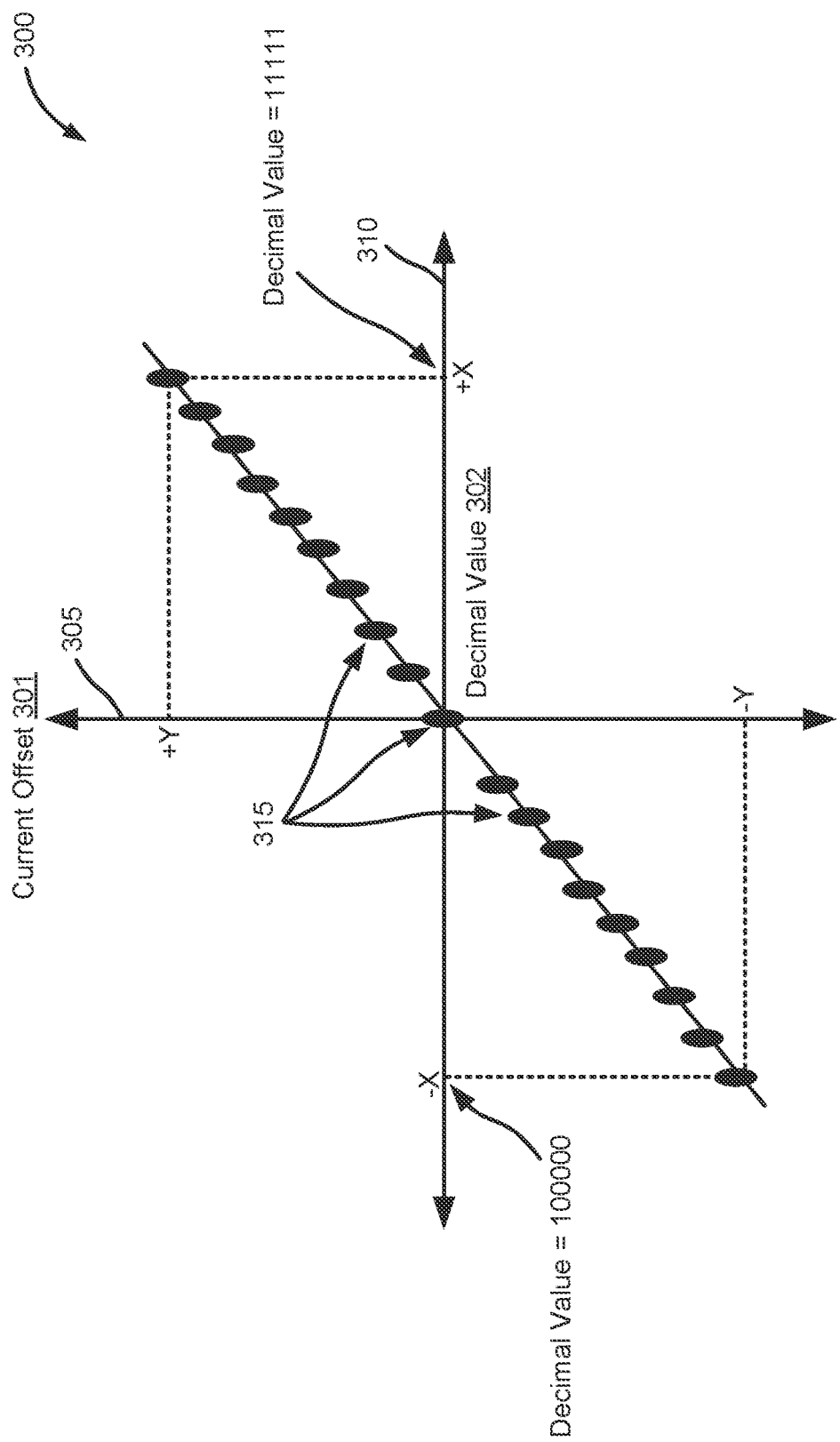
FIG. 3 shows an example graph of a voice coil motor (VCM) current offset against decimal values stored in a register which allows for compensation of a transition offset induced while transitioning between a pulse width modulation (PWM) mode and a linear mode, according to various aspects of the disclosure.

FIG. 3 shows an example graph 300 of a current offset 301 (on the vertical or y-axis 305) against a decimal value 302 (on the horizontal or x-axis 310), where the decimal values 302 are stored in a register. In some embodiments, the PLSI circuitry (e.g., control circuitry 22) is configured to introduce an offset (also referred to as offset compensation) in at least one of the PWM and linear/CCL modes via one or more hardware (HW) implementations, where the offset is used to compensate for a steady-state error between the two modes. In one non-limiting example of a HW implementation, an input offset of a current sense amplifier (CSA) may be trimmed, which results in the output of the CSA being trimmed, for instance, by a few millivolts (mV). In some cases, the amount of CSA offset trimmed may be constrained within a certain range (e.g., up to +/−1 mV, up to +/−5 mV, up to +/−10 mV, to name a few non-limiting examples). The trimming of the CSA offset by the control circuitry 22 may translate to a steady-state offset in the VCM current, i.e., a VCM current offset 301, that compensates for the offset created in the PWM mode. As an example, if the CCL offset (i.e., offset in the linear mode) is 0 mA and the PWM offset (i.e., offset in the PWM mode) is 3 mA, the CSA offset may be set to −3 mA when operating in the PWM mode and 0 mA when operating in the CCL mode. In another example, the CCL offset is 2 mA and the PWM offset is 6 mA. Here, the CSA offset may be set to −2 mA for the CCL mode and −6 mA for the PWM mode. The offsets and corresponding offset compensation values listed herein are exemplary and not intended to be limiting. Aspects of the disclosure may support compensation of a wide variety of transient and steady-state offsets created during normal operations (e.g., seeking) of a disk drive.

In some other cases, the VCM DAC may be adjusted based on the steady-state offset/error between the PWM and CCL modes. For example, a pre-defined number of least significant bits (LSB) corresponding to the offset compensation (i.e., desired current offset) may be added or subtracted from the VCM DAC. While not necessary, in some embodiments, this adjustment of the VCM DAC may be hidden to the FW. In such cases, the firmware (FW) DAC receives the hardware (HW) DAC offset that has already been adjusted to compensate for the steady-state offset or error between the two modes.

In some cases, the VCM current offset 301 may be +/−10 mA, although other ranges of VCM current offsets are contemplated in different embodiments. The range of VCM current offset selected may be based on one or more factors, such as, the complexity of hardware design permissible for a certain use case. For instance, a larger range of current offset (e.g., +/−10 mA as compared to +/−1 mA) may serve to reduce the complexity of the hardware design (e.g., lower die, cost, etc.) but also reduce the granularity (e.g., mA resolution/bit) of the offset compensation in the PWM/CCL mode. In some use-cases, a lower offset difference (e.g., +/−1 mA) may be implemented, for instance, when higher accuracy (lower track arrival PES) is needed. In some examples, the present disclosure may support resolution control (e.g., using a register for storing decimal values) to have finer control of offset compensation in the PWM and CCL mode(s). In the example shown in FIG. 3, six (6) bit decimal values are used in the register to control the offset. Specifically, FIG. 3 depicts an example of a lookup table/function, register, or another data structure, that may be used to control the offset in the PWM or CCL mode. Here, each current offset data point 315 corresponds to a six (6) bit decimal value (X-intercept). For example, when the decimal value is 11111, the current offset equals the positive Y-intercept (e.g., +10 mA current offset). Similarly, when the decimal value is 100000, the current offset equals the negative Y-intercept (e.g., −10 mA). Using these values (e.g., +/−10 mA offset and a 6-bit decimal value), the resolution/bit may be calculated to be about 0.31 mA resolution/bit. It should be noted that, the examples listed herein are in no way intended to be limiting. For example, a different number of bits (e.g., 4-bits, 8-bits, 16-bits, etc.) and/or a different current offset range (e.g., +/−1 mA, +/−5 mA, +/−20 mA) may be utilized in different embodiments.

In some examples, the control circuitry 22 is configured to trim the CSA offset based on selecting the specific decimal value (e.g., 111111) corresponding to the VCM current offset compensation. In some cases, two HW registers (e.g., one for the PWM mode offset and one for the CCL mode offset) may be utilized. While FIG. 3 shows one example of a register (e.g., for the PWM mode offset), it should be understood that a similar or substantially similar register may be used for the other mode. Further, the number of bits of decimal values used and/or the current offset range for the PWM and CCL offsets registers may be the same or different.

In some other cases, the control circuitry 22 automatically switches the offset compensation to the PWM mode offset or the linear/CCL mode offset when the mode of operation of the VCM is switched. In some cases, the control circuitry 22 or the firmware (FW) is configured to switch the VCM mode of operation and/or the offset compensation. In such cases, a different VCM offset (e.g., a PWM mode offset, a CCL mode offset) may be utilized depending on the current mode of operation, i.e., PWM mode or CCL mode, and the new mode of operation of the VCM. When the control circuitry 22 detects a transition of the VCM from one mode (e.g., PWM mode) to the other mode (e.g., CCL mode), the VCM driver 24 or the control circuitry 22 switches the VCM current offset/offset compensation, which allows for compensation of the steady-state offset between the two modes.

In some embodiments, aspects of the present disclosure may be implemented in both FW and HW. For example, the FW may utilize a tuning method to optimize the PES as the disk head arrives at the target track during a seek, while also optimizing power consumption by operating the seek in the PWM mode for a longer duration, as compared to the prior art. In some examples, the FW may utilize a calibration routine, where the calibration routine results in a lookup table/function, or another data structure, of different tunings recorded for different seek lengths (e.g., seek duration, seek distance), heads, and/or directions (e.g., from inner diameter or ID to outer diameter or OD, from OD to ID). In some aspects, utilizing different seek lengths (i.e., as opposed to a single static seek length) may help account for the variation in bias current to hold the VCM in place at different locations on the disk surface. In some cases, the calibration routine may comprise an initial calibration phase, where a binary search is used to sweep through different VCM current offset values during seeks to identify an optimal offset value that results in the lowest PES (i.e., the lowest PWM/CCL steady-state offset). As an example, a steady-state offset in each of the PWM and CCL modes may be determined using a first seek length and direction (e.g., ID to OD of disk). For instance, if the PWM offset is 3 mA and the CCL offset is 0 mA, a −3-mA offset may be set in the PWM offset register to compensate for the 3-mA offset created while operating in the PWM mode. In some cases, the FW may be configured to update this offset compensation value (−3 mA) in the PWM offset register for different seek lengths, heads, and/or directions. For example, if the PWM offset in a second direction (e.g., OD to ID of disk) is 4 mA, the −3-mA offset compensation value may be used while operating in the PWM mode and seeking in the first direction and a −4-mA offset compensation value may be used while operating in the PWM mode and seeking in the second direction.

Figure 4:
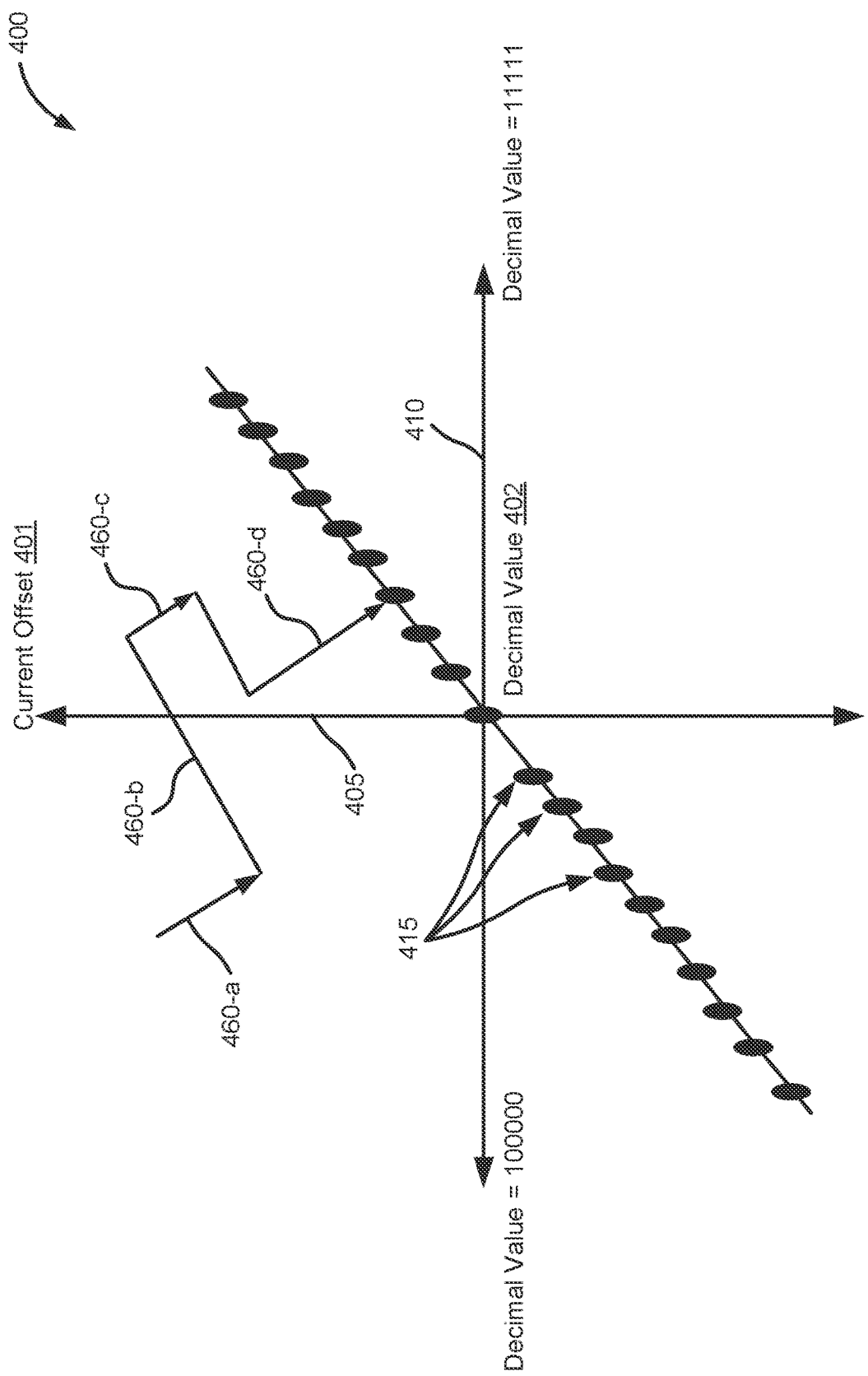
FIG. 4 illustrates an example graph of a VCM current offset against decimal values stored in a register which allows for compensation of a transition offset induced while transitioning between a pulse width modulation (PWM) mode and a linear mode, according to various aspects of the disclosure.

FIG. 4 depicts a visual example demonstrating the binary search concept described above. As seen, FIG. 4 shows an example graph 400 of current offset 401 (on the vertical or y-axis 405) against a decimal value 402 (on the horizontal or x-axis 410), where the decimal values correspond to the values implemented in the register. The arrows 460 (e.g., arrows 460-a, 460-b, 460-c, 460-d) depict the flow of the binary search algorithm and the last arrow 460-d shows the final data point 415 corresponding to the most optimal track arrival PES (or lowest PWM-CCL offset).

Figure 5:
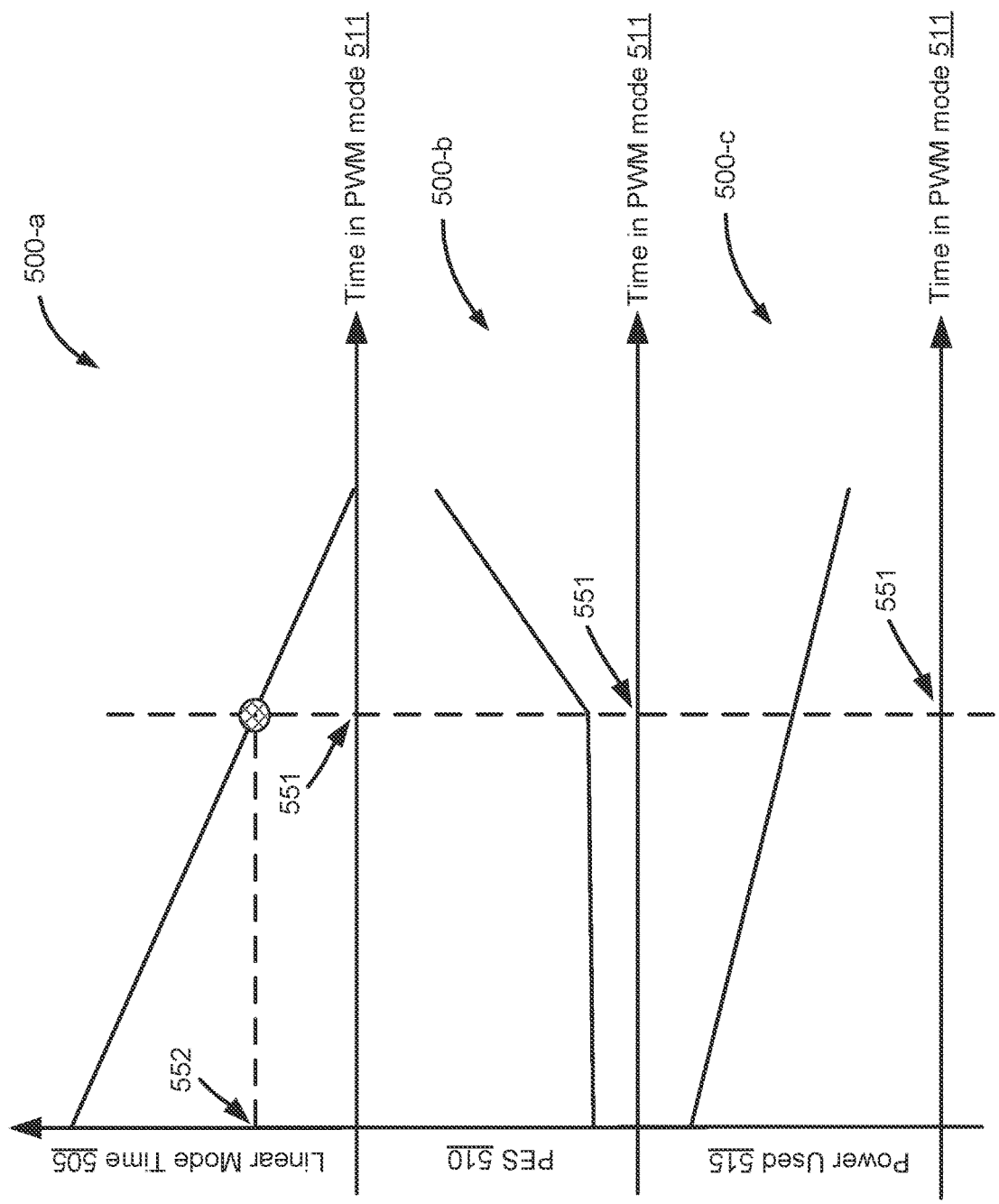
FIG. 5 illustrates example graphs for a calibration routine implemented in firmware (FW), according to various aspects of the disclosure.

FIG. 5 illustrates example graphs for a calibration routine implemented in the FW, according to various aspects of the disclosure. In some cases, the calibration routine described in relation to FIG. 5 may be performed after an initial offset compensation value is obtained. Graph 500-a depicts the linear mode time 505 (e.g., in ms) against PWM mode time 511, where the linear mode time 505 refers to the "time spent in linear mode". Further, graph 500-b depicts the PES 510 (e.g., as a percentage of servo track width) against the PWM mode time 511, while graph 500-c depicts the power used 515 against the PWM mode time 511. After determining a preliminary/initial offset compensation value, the control circuitry 22 incrementally decreases the time spent in linear mode, as shown in graph 500-a. As seen, the power used decreases as the amount of time spent in linear mode decreases (i.e., as the amount of time spent in PWM mode increases). In contrast, the PES (e.g., track arrival PES) increases as the time spent in linear mode decreases. As shown in graph 500-b, there is a negligible increase in the PES (i.e., when the PWM mode time is below time 551), followed by a sharp increase (i.e., when the PWM mode time is above time 551). In some examples, the FW determines the linear mode time based on this time 551. Specifically, the FW selects time 551 as the PWM mode time and determines the y-intercept 552 in graph 500-a as the linear mode time. In this way, the control circuitry 22 and/or the FW determines the lowest amount of time that the VCM can spend in the linear mode with minimal to no impact on the PES. By decreasing the linear mode time for the VCM, as compared to the prior art, the control circuitry 22 helps optimize the power consumption during seek operations.

Figure 6:
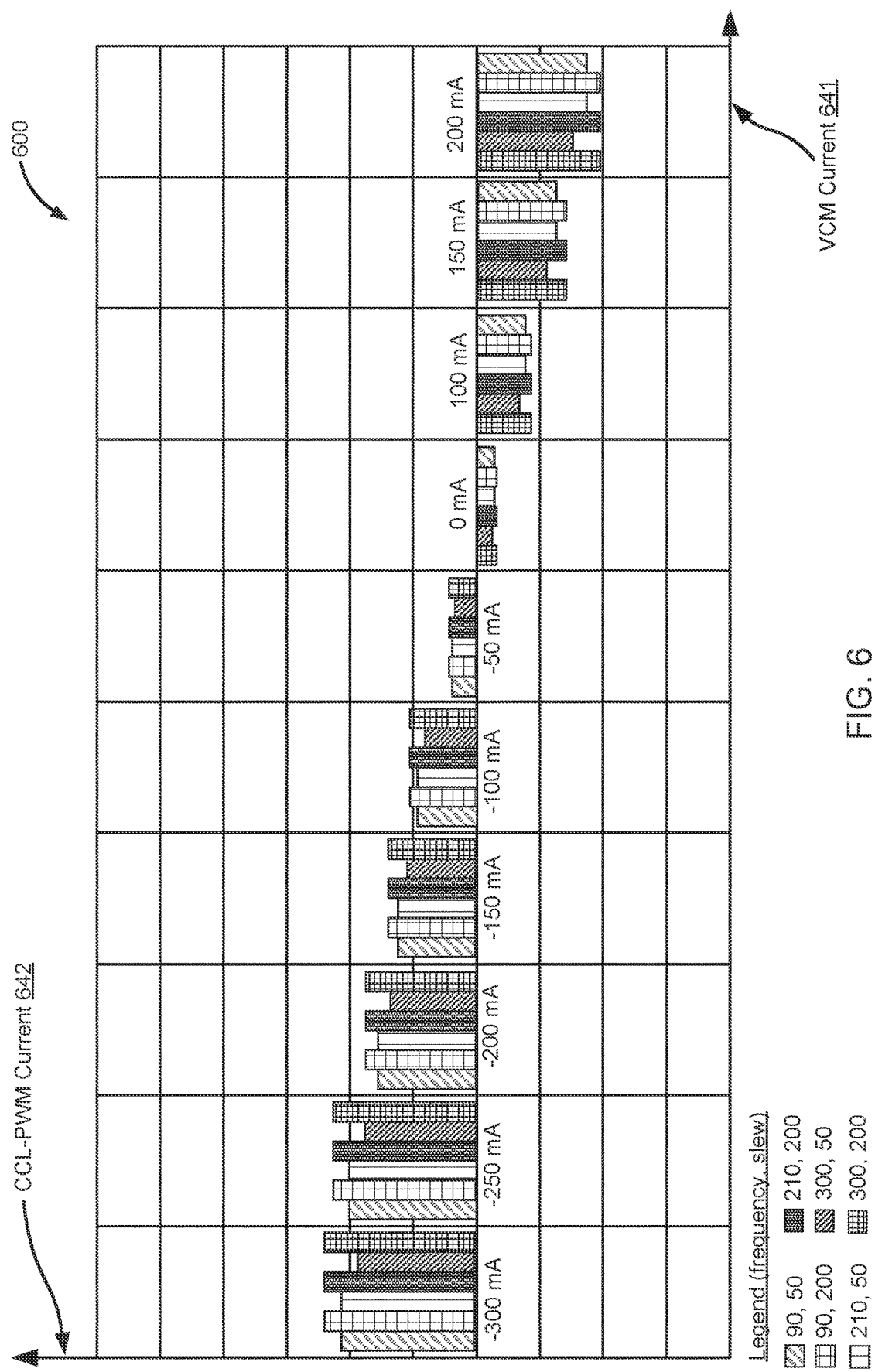
FIG. 6 illustrates an example graph of transition offsets against VCM current for different PWM frequency and slew rate combinations, according to various aspects of the disclosure.

FIG. 6 illustrates an example graph 600 of the CCL-PWM current offset 642 (e.g., steady-state offset between PWM and CCL modes) against VCM current 641, according to various aspects of the disclosure. As described above, an offset is created between the linear mode and the VCM mode when the same VCM current is supplied to the VCM. In some circumstances, a transient current fluctuation may also be generated during the transition between the two modes, for example, by a voltage corresponding to the offset at the output stage of the VCM driver.

In some cases, the control circuitry 22 reapplies the binary search algorithm (e.g., described in relation to FIG. 4) after each time step reduction in the linear mode, since the CCL-PWM current offset changes based on the VCM current level (or time spent in linear mode). For example, as seen in graph 600, the offset shown on the vertical or y-axis varies based on the VCM current applied. Graph 600 also depicts the relation of the offset for each VCM current level (e.g., −300 mA, −250 mA, 100 mA, 150 mA, etc.) applied with respect to different PWM frequency and slew rate combinations. Specifically, the different bar graphs for each VCM current level correspond to different PWM frequency and slew rate combinations. In this example, the PWM frequency and slew rates are in units of kHz and V/uS, respectively. As seen, the CCL-PWM current offset at the same VCM current 641 level varies for different PWM frequency and slew rate combinations (e.g., 90 kHz, 50 V/uS; 90 kHz, 200 V/uS; 210 kHz, 200 V/uS, etc.).

Figure 7:
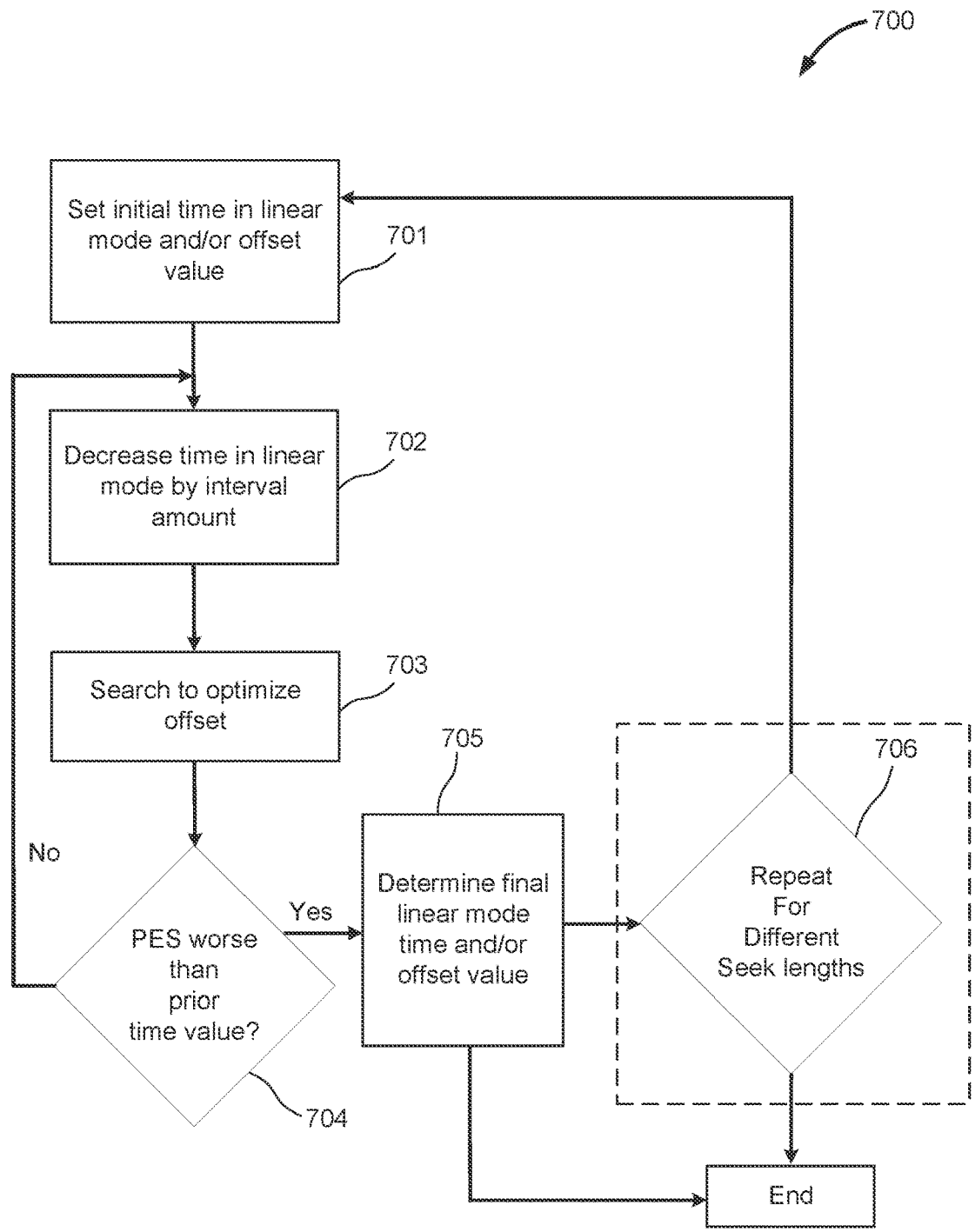
FIG. 7 illustrates an example of a method for determining an optimal linear mode time and/or an offset compensation value, according to various aspects of the disclosure.

FIG. 7 illustrates an example of a method 700 for determining an optimal linear mode time and/or an offset value, according to various aspects of the disclosure. The method 700 may be implemented by the control circuitry 22, or alternatively, the VCM driver 24. In other cases, the method 700 may be implemented in the FW. Further, the method flow 700 implements one or more aspects of the calibration routine and tuning method described above and elsewhere throughout the disclosure.

At step 701, the method comprises setting an initial time in linear mode and/or setting an initial offset value (e.g., VCM current sense offset to compensate for the PWM-CCL modes steady-state offset). In one non-limiting example, the initial linear mode time and offset compensation value may be determined as described above in relation to FIGS. 4 and 5. For example, the control circuitry 22 may perform a calibration routine to sweep through different offset compensation values to find the offset compensation value resulting in the lowest PES, which may be indicative of the lowest PWM-CCL transition offset (e.g., a steady-state offset between the PWM and CCL modes).

At step 702, the method comprises decreasing the linear mode time by an interval amount (e.g., 1 µs, 3 µs, etc.). Next, at step 703, the method comprises performing a search (e.g., a binary search) to optimize the initial offset compensation value based on the new linear mode time. As described in relation to FIG. 5, the FW or the control circuitry 22 may be configured to incrementally reduce the time in linear mode and monitor the corresponding track arrival PES. This enables an optimal linear mode time to be determined, which helps reduce power consumption during seek operations. In this way, the present disclosure helps reduce the time spent in linear mode, without adversely impacting the track arrival PES.

At step 704, the control circuitry 22, or the servo control system, determines whether the PES (i.e., for the new linear mode time and offset value) is worse than the PES for the prior linear mode time/offset value. If yes, at step 705, the method 700 comprises determining a final linear mode time and offset value to compensate for the PWM-linear mode transition offset (e.g., a steady-state offset between the two modes). That is, at step 705, the control circuitry 22 (or the FW) determines the linear mode time and offset value combination corresponding to the lowest PES. If no, the method 700 returns to step 702 and continues until an optimum linear mode time and/or offset value is determined (i.e., when the decision at step 704 is Yes).

At step 706 (optional), the method comprises repeating steps 701-705 for different seek lengths or directions. As previously noted, the bias current to hold the VCM in place over a certain location on the disk surface may vary at different locations (e.g., for different seek lengths).

FIGS. 8A-8C depict conceptual graphs 800 of VCM waveforms during a transition from PWM mode to linear mode in the prior art. Graph 800-*a* depicts the VCM current against time for two different VCM PWM frequency/slew combinations. Currently, FW uses a 210 Khz PWM frequency and a 50 V/uS slew rate for the VCM PWM mode. Ideally, a higher slew rate (e.g., 200 V/uS) may help reduce power consumption. However, a higher slew rate leads to a larger transition/steady-state offset between the two modes, which needs to be compensated for to reduce the PES or random transient vibrations (RTV). Accordingly, to reduce PES, currently used techniques utilize a lower slew rate (e.g., 50 V/uS) while operating the VCM in the PWM mode. This adversely impacts the power efficiency of the HDD. As seen, FIG. 8B depicts a zoomed-in view of the transition 810 in FIG. 8A, including a first/baseline VCM current waveform 830 (e.g., for a 210 kHz PWM frequency and a 50 V/uS slew rate) and a second VCM current waveform 831 (e.g., for a 210 kHz PWM frequency and a 200 V/uS slew rate). FIG. 8B also depicts the offset 820 between the baseline vs the higher slew rate plot. In some circumstances, this offset 820 results in an oscillation in the VCM current as the servo control loop tries to correct the offset. For example, FIG. 8C depicts averaged VCM current waveforms for both the baseline (shown as 832) and the higher slew rate (shown as 833). As seen, there is more oscillation when a higher slew rate is used as compared to the baseline.

Figure 9:
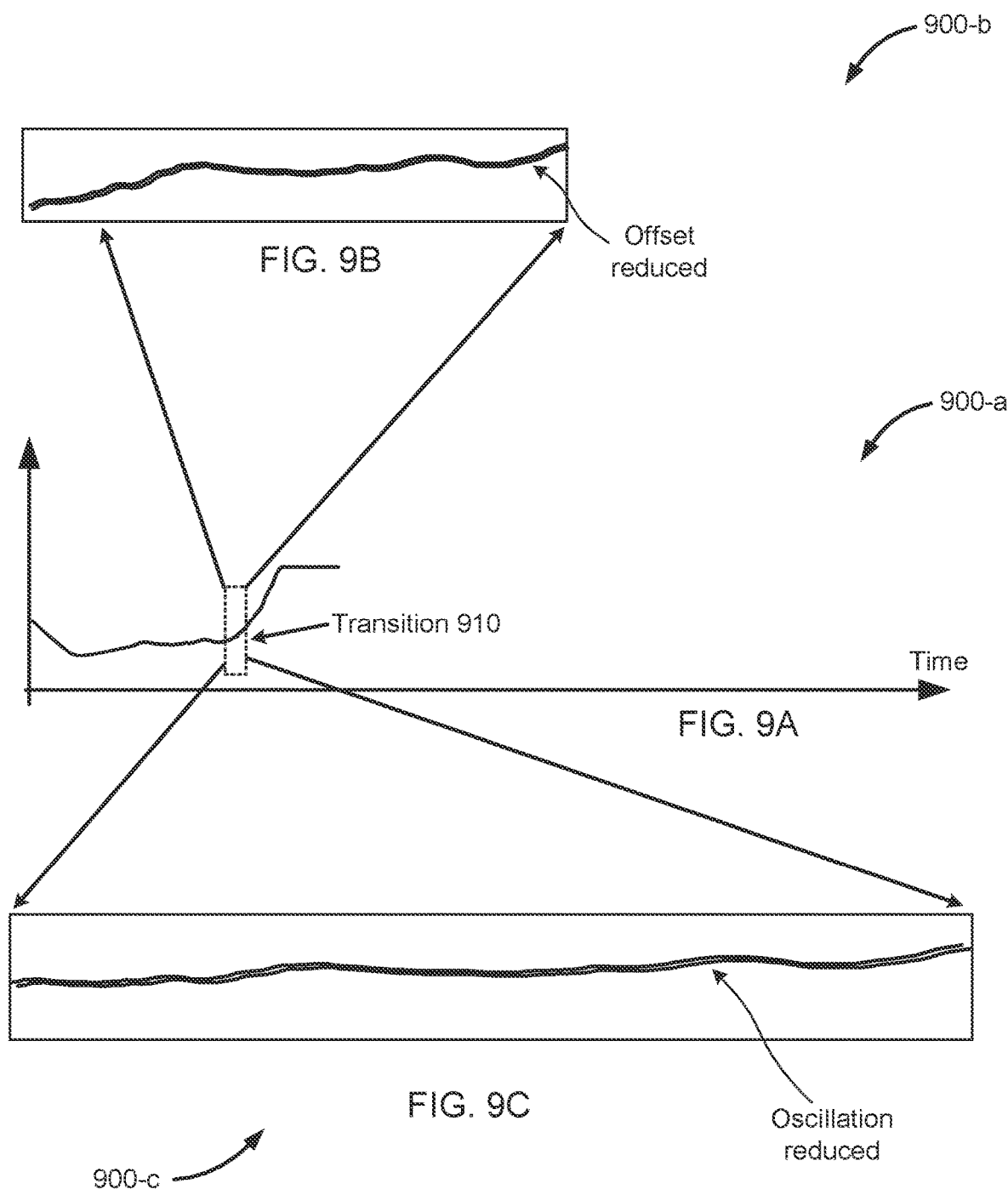
FIGS. 9A-9C depict conceptual graphs of VCM waveforms measured during a transition from a PWM mode to a linear mode showing the reduction in the transition offset and current oscillations, as compared to the prior art, according to various aspects of the disclosure.

FIGS. 9A-9C depict conceptual graphs 900 of VCM waveforms during a transition from PWM mode to linear mode and after compensating for the PWM-CCL mode transition offset, according to various aspects of the disclosure. In some cases, the PWM-CCL mode transition offset, which may be a steady-state offset between the two modes, introduced from a higher slew rate (e.g., 200 V/uS vs 50 V/uS) may be compensated by trimming the VCM current sense offset. Similar to graphs 800-*a-c*, graph 900-*a* depicts the VCM voltage against time for two different VCM PWM frequency/slew combinations. Further, graph 900-*b* depicts a zoomed-in view of the transition 910 in FIG. 9A, showing the reduction (as compared to graph 800-*b*) in the transition/steady-state offset achieved by trimming the VCM current sense offset. As noted above, the CSA output voltage may be affected when the input to the CSA 1040 is trimmed. For example, the trimming of the CSA 1040 input may cause the output voltage at the CSA 1040 to also be trimmed. Since the output voltage at the CSA 1040 is subtracted from the VCM DAC to generate an error signal and the power driver is used to drive an amplified version of the error signal, the trimming of the VCM current sense offset helps compensate for the steady-state offset between the PWM and CCL modes. As an example, a higher slew rate may introduce a −5-mA offset between the two modes. In accordance with various aspects of the disclosure, the VCM current sense offset may be trimmed (e.g., to 0.4 mV, which may correspond to about a +5-mA offset in the VCM current), enabling compensation of the PWM-CCL steady-state offset introduced from the higher slew rate.

It should be noted that, frequency/slew rate combinations and/or offset values (e.g., VCM current sense offset, PWM-CCL transition or steady-state offset, offset compensation values) discussed above in relation to FIGS. 8 and 9 are exemplary only and not intended to be limiting. They are meant to elucidate the flexibility in the VCM PWM frequency and/or slew rate settings provided in accordance with aspects of the disclosure. Further, while FIGS. 8 and 9 generally discuss varying the slew rate, this is in no way intended to be limiting. It is contemplated that the VCM PWM frequency may also be varied (i.e., in addition to, or in lieu of, the slew rate). In some cases, varying the PWM frequency may also introduce an offset that may be compensated, for instance, by trimming the VCM current sense offset.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SoC). In addition, the control circuitry may include a preamp circuit implemented as a separate integrated circuit, integrated into the read channel or data storage controller circuit, or integrated into an SoC.

In some examples, the control circuitry comprises a microprocessor executing instructions, the instructions being operable to cause the microprocessor to perform the flow diagrams described herein. The instructions may be stored in any computer-readable medium. In some examples, they may be stored on a non-volatile semiconductor memory device, component, or system external to the microprocessor, or integrated with the microprocessor in an SoC. In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and sub combinations are intended to fall within the scope of this disclosure. In addition, certain method, event or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, an FPGA, a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for optimizing the VCM PWM-linear mode transition offset to minimize PES, such as track arrival PES, for data storage, and other aspects of this disclosure. Persons skilled in the relevant fields of art will be well-equipped by this disclosure with an understanding and an informed reduction to practice of a wide panoply of further applications, architectures, techniques, and methods for optimizing the VCM PWM-linear mode transition offset to minimize PES for data storage, and other aspects of this disclosure encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator arm assembly comprising one or more disk heads and a voice coil motor (VCM), the VCM configured to operate in a first mode and a second mode, the first mode and the second mode each comprising one of a pulse width modulation (PWM) mode and a linear or current control loop (CCL) mode, the first mode being different from the second mode, and wherein the first mode corresponds to a first offset compensation value and the second mode corresponds to a second offset compensation value; and
   one or more processing devices configured to:
   cause the VCM to seek towards a target track in the first mode for a first duration;
   control transition of the VCM from under the first mode to a second mode, wherein controlling the transitioning comprises:
   switching, at or near an end of the first duration, an offset compensation value from the first offset compensation value to the second offset compensation value to compensate for a transition offset induced while transitioning the VCM from the first mode to the second mode; and
   seeking the VCM toward the target track in the second mode for a second duration.

2. The data storage device of claim 1 wherein the first mode comprises the pulse width modulation (PWM) mode and the second mode comprises the linear or current control loop (CCL) mode.

3. The data storage device of claim 2, wherein the one or more processing devices are further configured to:
determine the first offset compensation value;
determine the second duration, the second duration corresponding to a time in linear mode, wherein determining the second duration is based at least in part on determining the first offset compensation value;
monitor a first track arrival position error signal (PES), the first track arrival PES corresponding to a PES after a first calibration seek using the first offset compensation value and after the second duration is complete;
update one or more of the first offset compensation value and the second duration;
monitor a second track arrival PES, the second track arrival PES corresponding to a PES after a second calibration seek using the updated first offset compensation value and the updated second duration is complete; and
compare the first and the second track arrival PES to determine an optimal offset compensation value and an optimal time in linear mode.

4. The data storage device of claim 1, wherein the offset compensation value compensates for the transition offset by inducing an offset in a current applied to the VCM, and wherein the transition offset is a steady-state offset between the first and the second modes.

5. The data storage device of claim 4, wherein the first offset compensation value translates to a first offset in the current applied to or generated by the VCM and the second offset compensation value translates to a second offset in the current applied to or generated by the VCM.

6. The data storage device of claim 1, wherein the one or more processing devices are further configured to:
determine a first transition offset induced while transitioning the VCM from the first mode to the second mode;
determine a second transition offset induced while transitioning the VCM from the second mode to the first mode; and
determine the first and the second offset compensation values, based at least in part on determining the first and the second transition offsets.

7. The data storage device of claim 1, wherein determining each of the first and the second offset compensation values comprises:
determining a trimming value for trimming a current sense amplifier (CSA) offset;
wherein the one or more processing devices are further configured to:
trim the CSA offset by the corresponding trimming value to induce an offset in a current generated by the VCM.

8. A method of operating a data storage device, comprising:
actuating, by one or more processing devices, a voice coil motor (VCM); and
causing the VCM to seek towards a target track in a first mode for a first duration;
controlling transition of the VCM from under the first mode to a second mode, the first mode and the second mode each comprising one of a pulse width modulation (PWM) mode and a linear or current control loop (CCL) mode, the first mode being different from the second mode, and wherein the first mode corresponds to a first offset compensation value and the second mode corresponds to a second offset compensation value, and wherein the transitioning comprises:
switching, at or near an end of the first duration, an offset compensation value from the first offset compensation value to the second offset compensation value to compensate for a transition offset induced while transitioning the VCM from the first mode to the second mode; and
seeking the VCM toward the target track in the second mode for a second duration.

9. The method of claim 8, wherein the first mode comprises the PWM mode and the second mode comprises the linear mode, and wherein the offset compensation value compensates for the transition offset by inducing an offset in the current applied to the VCM, and wherein the transition offset is a steady-state offset between the PWM and linear modes.

10. The method of claim 9, wherein the first offset compensation value translates to a first offset in the current applied to or generated by the VCM and the second offset compensation value translates to a second offset in the current applied to or generated by the VCM.

11. One or more processing devices comprising:
means for actuating a voice coil motor (VCM);
means for causing the VCM to seek towards a target track in a first mode for a first duration, wherein the first mode corresponds to a first offset compensation value;
means for controlling transition of the VCM from under the first mode to a second mode, the first mode and the second mode each comprising one of a pulse width modulation (PWM) mode and a linear mode, the first mode being different from the second mode, and wherein the means for controlling transition of the VCM comprises:
means for switching, at or near an end of the first duration, an offset compensation value from the first offset compensation value to a second offset compensation value to compensate for a transition offset induced while transitioning the VCM from the first mode to the second mode, wherein the second offset compensation value corresponds to the second mode; and
means for seeking the VCM toward the target track in the second mode for a second duration.

* * * * *